United States Patent
Cras et al.

(10) Patent No.: US 7,222,130 B1
(45) Date of Patent: May 22, 2007

(54) REPORT THEN QUERY CAPABILITY FOR A MULTIDIMENSIONAL DATABASE MODEL

(75) Inventors: Jean-Yves Cras, Paris (FR); Ricardo Polo-Malouvier, Levallois-Perret (FR); Henri Biestro, Saint Cloud (FR)

(73) Assignee: Business Objects, S.A., Levallois-Perret (FR)

( * ) Notice: Subject to any disclaimer, the term of this patent is extended or adjusted under 35 U.S.C. 154(b) by 326 days.

(21) Appl. No.: 10/673,090

(22) Filed: Sep. 26, 2003

Related U.S. Application Data

(63) Continuation of application No. 09/826,426, filed on Apr. 3, 2001, now abandoned.

(60) Provisional application No. 60/194,232, filed on Apr. 3, 2000.

(51) Int. Cl.
*G06F 17/30* (2006.01)

(52) U.S. Cl. .................. 707/103 R; 707/3; 707/10; 707/104.1; 706/45; 709/225; 715/501.1; 379/133

(58) Field of Classification Search .............. 707/2, 707/3, 10, 104.1, 101, 103 R, 203, 205, 4; 715/501.1, 854; 706/45; 379/133; 709/225; 712/210
See application file for complete search history.

(56) References Cited

U.S. PATENT DOCUMENTS

| | | | |
|---|---|---|---|
| 5,511,186 A * | 4/1996 | Carhart et al. .................. | 707/2 |
| 5,555,403 A * | 9/1996 | Cambot et al. ................. | 707/4 |
| 5,778,375 A * | 7/1998 | Hecht .......................... | 707/101 |
| 5,918,232 A * | 6/1999 | Pouschine et al. ......... | 707/103 R |
| 6,182,060 B1 * | 1/2001 | Hedgcock et al. ............. | 707/1 |
| 6,260,050 B1 * | 7/2001 | Yost et al. ................ | 715/501.1 |
| 6,366,922 B1 * | 4/2002 | Althoff .................... | 707/103 R |
| 6,385,301 B1 * | 5/2002 | Nolting et al. .............. | 379/133 |
| 6,385,604 B1 * | 5/2002 | Bakalash et al. .............. | 707/3 |
| 6,408,292 B1 * | 6/2002 | Bakalash et al. .............. | 707/3 |
| 6,411,681 B1 * | 6/2002 | Nolting et al. .............. | 379/133 |
| 6,434,544 B1 * | 8/2002 | Bakalash et al. .............. | 707/2 |
| 6,581,154 B1 * | 6/2003 | Zaidi .......................... | 712/210 |
| 6,691,140 B1 * | 2/2004 | Bogrett ....................... | 707/205 |

(Continued)

OTHER PUBLICATIONS

Vassiliadis, Panos, "Modeling Multidimensional Database, Cubes, and Cube operations", Proceedings of the Tenth International Conference on Scientific and Statistical Database Management, Jul. 1-3, 1998, pp. 53-62.*

*Primary Examiner*—Shahid Alam
(74) *Attorney, Agent, or Firm*—Cooley Godward Kronish LLP

(57) ABSTRACT

A system and a method for creating an analytical report on top of a multidimensional data model built on top of a relational or multidimensional database. The database operates in a computer system and provides returned values responsive to queries. Such a query is generated automatically and is deduced from a report definition. According to one embodiment, a report specification is used by the system and method of the present invention is able to defer the initial query of the data source, as is the case with conventional reporting tools and methods, until after the report has been defined. That is, the manner in which a analytic report is defined provides for an automatically generated query. Once the report has been defined, the data to populate such a report is retrieved to build the document.

13 Claims, 14 Drawing Sheets

U.S. PATENT DOCUMENTS

| | | | |
|---|---|---|---|
| 6,714,979 B1 * | 3/2004 | Brandt et al. | 709/225 |
| 6,721,405 B1 * | 4/2004 | Nolting et al. | 379/133 |
| 6,744,866 B1 * | 6/2004 | Nolting et al. | 379/133 |
| 6,768,995 B2 * | 7/2004 | Thier et al. | 707/100 |
| 6,859,798 B1 * | 2/2005 | Bedell et al. | 706/45 |
| 2001/0012345 A1 * | 8/2001 | Nolting et al. | 379/133 |

* cited by examiner

| Reporting Object | Function | Query | # of Axes | Zones | Container | Atomic |
|---|---|---|---|---|---|---|
| Document | • Document can only contain Reports<br>• For all Reports in a document are based on the same data source. |  | 0 |  | ✓ |  |
| Report | • A Report can be contained by a Document.<br>• A Report contains a Page Header, Body, and Footer.<br>• A Report has one or more pages.<br>• The Page Header and Footer are repeated on each page. | ✓ | 0 |  | ✓ |  |
| Section | • Defines a band with infinite width and a specific height.<br>• A Section can be contained by a Report or another Section. | ✓ | 1 | ✓ | ✓ |  |
| VTable | • Vertical Table | ✓ | 1 | ✓ | ✓ |  |
| HTable | • Horizontal Table | ✓ | 1 | ✓ | ✓ |  |
| XTable | • Cross Table | ✓ | 2 | ✓ | ✓ |  |
| Graph | • Cannot contain other items<br>• Has two axes although certain graph types ignore second axis. | ✓ | 2 |  |  | ✓ |
| Cell | • Contain a measure, string, date, scalar expression (expression that returns only one value) or a picture. |  | 0 |  |  | ✓ |
| Bag | • Do not normally have DataSpace expression. |  | 0 |  | ✓ |  |
| HStripe | • Bag where all instances of contained objects are aligned horizontally. |  | 0 |  | ✓ |  |
| VStripe | • Bag where all instances of contained objects are aligned vertically. |  | 0 |  | ✓ |  |

*FIG. 6*

| Time | Geography | Product | Sales/1000 |
|------|-----------|---------|------------|
| | | Customer XYZ | |
| 1999 | US | SKU200 | 100 |
| 1999 | France | SKU200 | 200 |
| 1999 | US | SKU300 | 50 |
| 1999 | France | SKU300 | 25 |
| 2000 | US | SKU200 | 25 |
| 2000 | France | SKU200 | 200 |
| 2000 | US | SKU300 | 200 |
| 2000 | France | SKU300 | EMPTY |
| | | | 800 |

*FIG. 9*

Table:

| Cell 1 | Cell 2 | Cell 3 | Cell 4 | } Header Stripe |
|--------|--------|--------|--------|------------------|
| Cell 1 | Cell 2 | Cell 3 | Cell 4 | } Body Stripe |
| | | | Cell 4 | } Footer Stripe |

*FIG. 10*

| Object | Axes | DataSpace Expression (other than 'CurrentMember') |
|---|---|---|
| Document | None | None |
| Report | None | Customer: "XYZ" |
| Title Cell | None | Scalar: Customer.CurrentMember.Caption |
| Table | None | Time: Years.Members  Geography: Country.Members |
|  |  | Product: Products.Members |
| Header Stripe | None | None |
| Geo Header Cell | None | Scalar: 'Geography.Caption' |
| Time Header Cell | None | Scalar: 'Time.Caption' |
| Product Header Cell | None | Scalar: 'Product.Caption' |
| Sales Header Cell | None | Scalar: "Sales/100" (a constant) |
| Body | Axis 0: Time, Geography, Produce | None |
| Body Stripe | None | None |
| Geo Cell | None | Scalar: Geography.CurrentMember.Caption |
| Time Cell | None | Scalar: Time.CurrentMember.Caption |
| Product Cell | None | Scalar: Product.CurrentMember.Caption |
| Sales Cell | None | Measures: Sales  Scalar: Value/100 |
| Footer Stripe | None | None |
| Footer Cell | None | Measures: Sales  Scalar: Value/100 |

*FIG. 11*

```
Report{
        Customer: Customer.XYZ
        Time: Time.All // default members
Product:,Product.All Geo: Geo.All
Measure: Revenue
Scalar: None
}
TitleCell{
        Customer Of report
        Time, Product, Geo, Measure: None
        Scalar=Customer_Caption
}
Table{
        Customer of Report
        Geo: Country.Members
        Time: Years.Members
        Product: Product.Members
        Measure: None
Scalar: NonEmptyContents // a (more efficient) equivalent to: Value Of {
Customer, Time, Product, Geo of Table
Measure = Sales
Scalar: Value/100
}
}
GeoHeaderCell{
        Geo, Customer, Time, Product, Measure: None
        Scalar: Dimensions.Geo.Caption // the caption of the dimension, not of a member
}
... // same for other headers
Body{// only captures axes
        Time, Geo, Product, Customer, Measure of Table
}
Geo Cell {
        Time, Product, Customer, Measure: None
Geo of Body
        Scalar: Geo_Caption
}
.../// idem for other caption cells
ValueCell {
        Time, Product, Customer, Geo of Body
        Measure: Sales
        Scalar: Value/100
}
```

*FIG. 13*

REPORT THEN QUERY CAPABILITY FOR A MULTIDIMENSIONAL DATABASE MODEL

CROSS-REFERENCES TO RELATED APPLICATIONS

This application claims priority from U.S. Provisional Application, entitled SYSTEM FOR ANALYZING MULTIDIMENSIONAL COMPUTER DATABASES, Application No. 60/194,232 and filed on Apr. 3, 2000. This application is also related to U.S. patent application Ser. No. 09/824,654 entitled ANALYTIC REPORTING ON TOP OF A MULTIDIMENSIONAL DATA MODEL and Ser. No. 09/826,425, entitled MAPPING OF AN RDBMS SCHEMA ONTO A MULTIDIMENSIONAL DATA MODEL, both filed Apr. 3, 2001. The above applications and their disclosures are incorporated herein by reference for all purposes.

BACKGROUND OF THE INVENTION

The present invention relates to information processing using multidimensional databases, and particularly to creating reports based upon data from a multidimensional database where the desired contents of the report are first defined and the following query is deduced from the report definition.

Relational database systems are well known in the prior art, and include tabular structures and structured query languages used for database queries. To aid in an understanding of the present invention, a glossary of terms is included hereinbelow. Relational database technology has made possible an independence between the way data is physically stored and the way it can be handled logically. Relational technology has been widely accepted in business, industry and engineering as valuable for storing data.

Database systems may also be implemented in technology termed OLAP (On-Line Analytical Processing). A key feature of OLAP is multidimensional view of data. These databases expose data not as entities and associations as does a Relational Database System but as sets of values organized in a so-called hypercube. This hypercube structure allows for easy access to data along different dimensions.

For example, a multidimensional database can organize numeric data along three dimensions: Product, Geography, Measures. The product dimension reflects the hierarchy of products in the organization, for example, Consumer and Enterprise products being further divided into more precise product categories down to the final product SKU. The Geography dimension will reflect the corporate organization from the entire company to countries to sales district or ZIP codes. Last, the Measures dimension captures more or less detailed sources of income and expenses, such as sales revenue, maintenance revenue (that may be grouped in a common "revenue" category), or operational expenses. These three dimensions define a system of coordinates. For each valid set of coordinates in this system such as, for example, "All Products", "US", "Revenue", the multidimensional database is able to retrieve a single value (numeric in most cases) that represents the aggregated value of the specified measure for the specified dimension coordinates.

From a user perspective a most important feature of database management software is the user interface and report creating capability. Reports generally format results in user friendly formats such as graphs, tables, crosstabs, or forms. A novel technique for providing a semantic layer for interpreting and interacting with a relational database is disclosed in commonly assigned U.S. Pat. No. 5,555,403 entitled "RELATIONAL DATABASE ACCESS SYSTEM USING SEMANTICALLY DYNAMIC OBJECTS" which is hereby incorporated by reference for all purposes.

Conventional reporting tools currently require a user to first specify the set of data to be retrieved from the datasource. And only after the data has been retrieved, does the reporting tools facilitate creation of reports on top of this set of data. The act of specifying a set of data to retrieve prior constructing a report is known as "Querying." Of the many Querying metaphors, the most powerful is the Business Objects™ Query Technique as described in the above-identified U.S. Pat. No. 5,555,403. When performing a query, users must first define the data they wish to retrieve before they are able to generate a report with queried data. If less data is retrieved than is required, then another query must be generated, followed by another generated report. If more data is retrieved than is required, then unnecessary efforts are expended to define a query and to retrieve unwanted data.

There is a need to provide a system and a method which overcomes the disadvantage of conventional reporting tools by effectively generating and building reports from multidimensional databases without unnecessarily retrieving the data from the database before the report is constructed.

BRIEF SUMMARY OF THE INVENTION

A system and a method for creating an analytical report on top of a multidimensional data model built on top of a relational or multidimensional database. The database operates in a computer system and provides returned values responsive to queries. Such a query is generated automatically and is deduced from a report definition. According to one embodiment, a report specification is used by the system and method of the present invention is able to defer the initial query of the data source, as is the case with conventional reporting tools and methods, until after the report has been defined. That is, the manner in which a analytic report is defined provides for an automatically generated query. Once the report has been defined, the data to populate such a report is retrieved to build the document. The report specification is a complete description of a document according to the present invention.

According to the present invention, a technique for creating an analytical report on top of a multidimensional data model is further built on top of either a relational or multidimensional database, or both. The database operates in a computer system and provides returned values responsive to queries specified in a predefined query language. The multidimensional data model includes a plurality dimensions organizing data as sets of values organized in a multidimensional cube structure.

In one embodiment, the method includes a user interface executing on a computer system operated by a human user, where the computer system executing the user interface includes a processor coupled to a memory. Also, the processor is further coupled to the user interface, data model, and the database. The method includes presenting to the user a plurality of selections, where each of the plurality of selections is associated with a reporting object, accepting user inputs, where the user inputs include a subset of the plurality of selections, parsing the accepted reporting objects into layout information and data definition information, using the data definition information to deduce a set of data, creating a query based upon the deduced set of data, and querying a data source to retrieve data associated with the deduced set of data.

In another embodiment, a system uses an inventive report-then-query metaphor, according to the present invention, to create an analytical report on top of a multidimensional data model built on top of a relational or multidimensional database. The multidimensional data model includes a plurality of dimensions organizing data as sets of values organized in a multidimensional cube structure. The system includes a reporting engine configured to receive a report specification from a client computing device, a cube configured to receive a data source query from the report engine, where the cube is configured to generate a query, and a data source configured to receive the query, A further understanding of the nature and advantages of the inventions herein may be realized by reference to the remaining portions of the specification and the attached drawings which describe specific forms of the invention, by way of example.

BRIEF DESCRIPTION OF THE DRAWINGS

FIG. 6 is a table listing reporting objecting according to a specific embodiment;

FIG. 9 is a diagram of a tabular report created by a specific embodiment of the present invention;

FIG. 10 is a diagram of an exemplary reporting objects layer for the tabular report of FIG. 9;

FIG. 11 is a diagram of an exemplary BlockQuery layer for the tabular report of FIG. 9; FIG. 13 is list of exemplary DataSource Expressions for the tabular report of FIG. 9.

DETAILED DESCRIPTION OF THE INVENTION

Figure 1A:
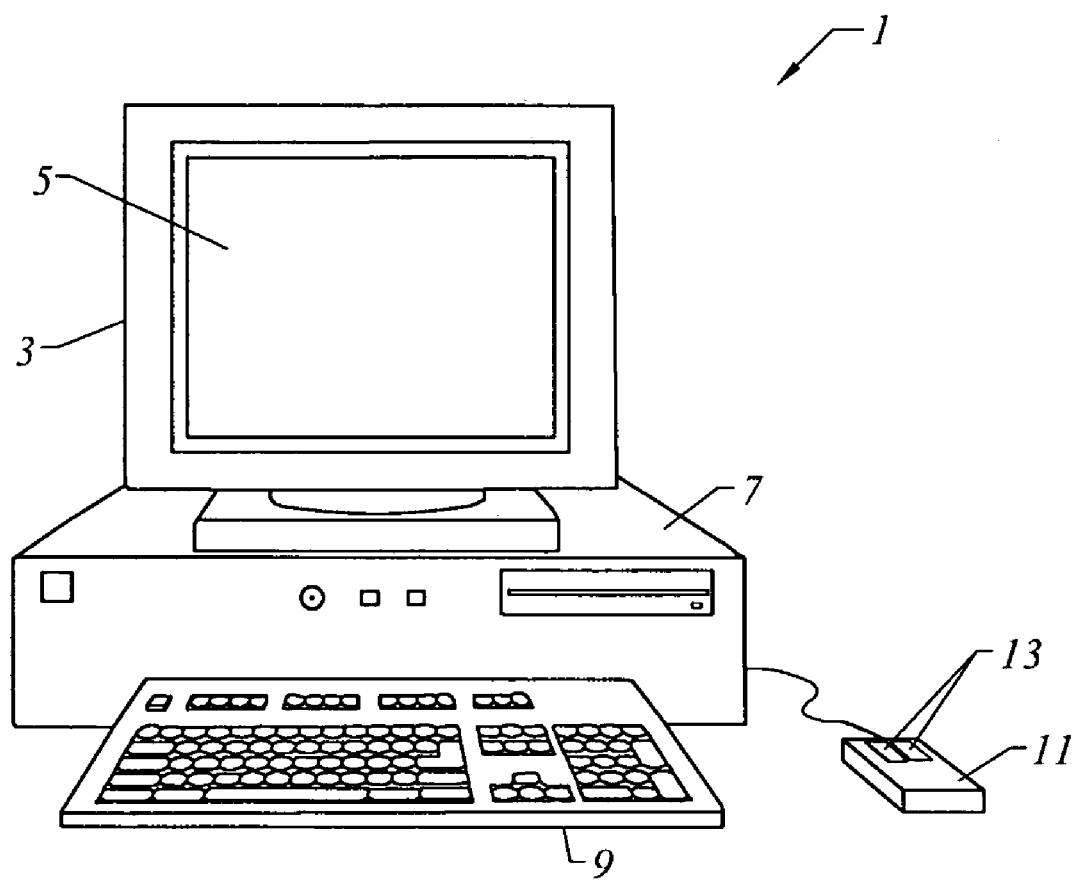
FIG. 1A is a computer system for presenting to a user a user interface suitable to practice an embodiment of the present invention.

Detailed descriptions of the embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Glossary

Axis: Defines the organization of a Cadenza Cube. All axes together define the Cube Structure's coordinate system. An axis can contain 0 . . . N Dimensions and is defined by the crossjoin of one or more dimensions.

BlockQuery: One node in the DSQuery, which contains information about the required query.

Cadenza Cube: Consists of a Cube Structure with references to the materialized data stored in the Compound Database. A Cadenza Cube has a coordinate system of ordinals. From a coordinate a user can obtain a set of tuples, which defines a point that contains either a value or another Cadenza Cube. For example, Cadenza Cube→Ordinal→Tuple→Point→Values OR Cadenza Cube. Sometimes referred to as the physical cube.

Cell: A Reporting Object that can contain a scalar value.

Client: Provides user interface (e.g., applet, ActiveX component, a full-client application, server-hosted client) that drives reporting process.

Compound Database (CDB): Supplies data and processing necessary to populate a report and consists of static and index (CDB) nodes. Static nodes contain data and information on how it was obtained. Index nodes reference other nodes. CDB provides interface to Navigator that allows it to access data. Also performs just-in-time local processing that maps the results from queries to expected results in report. Static nodes contain: Data, DataSpace Definitions, DSE-DSD Transformations, and Query Statement. Index nodes contain references to tuples inside other Nodes.

Crosstab: See XTable.

Cube Structure: Defines a coordinate system composed of tuples.

Data Source: A data source is an OLAP connection plus possibly other objects such as variables. A data source is also a Business Objects Universe.

Data Accessor: Contains a connection to a physical data source. Can be used to execute query passed to it by CDB. When query is executed it dispatches data to CDB and metadata to Outline.

Document Container of Reports and top-level element in the Report Specification.

DataSource Query: The Report Engine builds and sends the DSQuery to the Query Facility. It contains the (DSQuery) information necessary to build the query.

Dictionary: Provides interface for accessing metadata (e.g., Dimensions, Hierarchies, Levels, Members). Stores user-defined metadata local to Report. Accesses metadata from physical data source using Outline.

Extended Data Source: A source of data which retains OLAP points and dimension, and adds Dimensions of scalars and Calculated dimensions Filter: A filter is an object that selects members, such as a list of specific members like a list of values or a filter on any other formula that selects members dynamically.

Formula Language: A Business Objects specific language that provides a way to express complex queries.

Generic DataSource: Optimizes queries and checks if required data has been previously retrieved. (GDS)

HTable: A horizontal table (Reporting Object) that contains one axis.

Logical cube: Each reporting object inside a document has one logical cube associated to it. A logical cube is the definition of the need data to display a reporting object.

Metadata Data about data. Metadata describes how the structure and calculation rules are stored, plus, optionally, additional information on data sources, definitions, transformations, quality, date of last update, user privilege information, etc.

Metadata Objects: The metadata objects are objects that define a data source.
  (1) Universe: Class, Dimension, Detail, Measure and Member.
  (2) OLAP: Dimension, Level, Hierarchy, Member and Measure.

Navigator: Uses Cadenza Cube to provide Report Engine with access to data.

ODS: Original Data Source, which refers to a classical OLAP cube.

OLAP-QT: A Business Objects technology that provides an abstract semantic layer between the client and the physical multidimensional database.

Outline: Retrieves and stores metadata from Specific DataSource.

Process Context: Stores references to Data stored in CDB and DataSpace Definitions and transformations used to retrieve data.

Physical cube: All logical cubes associated to all reporting objects are merged and optimized to define the minimal set of queries needed to extract all the data needed by all reporting objects. The retrieved data is mapped to each of the reporting objects to display the needed result.

Query Facility: Defines query using data source-neutral terms. Creates Cube Structure that will later be used to build the Cadenza Cube.

Query Technique: A Business Objects technology that provides an abstract semantic layer between the (QT) client and the physical relational database.

Report: Acts as a container for all Reporting Objects with the exception of the Document. Report Engine Responsible for processing layout, not data. RE acts as intermediary between Client and other data- and metadata-processing components.

Report Output: The XML stream sent to the Client from the Report Engine that represents the resulting report. Also known as XML Output.

Report Specification: XML description of Report sent from Client to Report Engine. For example, it contains Graph, Axis, Style, Query, Page, and View information.

Reporting Object: An element of a report that normally has a visual and a query component (e.g., Report, Section, XTable, Bag) which are used to describe the desired structure of a report. A Reporting Object is sometimes referred to as a "block" for describing a Reporting Object. The different types of Reporting Objects are summarized below, such as the terms Query, Axis, Container, and Zone.

Reporting Context: The Reporting Context for a particular Reporting Object is defined as the path from the root (Document) to this object.

Section: A dynamic Reporting Object with infinite width and a specified height that contains one axis and one zone.

Specific DataSource: Creates data source-specific query and Data Accessor necessary to execute query (SDS).

Table: A general class of Reporting Objects. There are actually three types of tables: HTable, VTable, and XTable.

Universe: The universe is a semantic layer between the user and the database. It is created with BO Designer. The universe consists of classes and objects. The objects in the universe map to data in the database, and enable a user to build queries on the universe when creating or working on reports.

VTable: A vertical table (Reporting Object) that contains one axis.

XTable: A table that can contain nested dimensions on both the column and the row axis.

Introduction: Report then Query

Given a report specification, the system and method of the present invention is able to defer the initial query of the data source, as is the case with conventional reporting tools and methods, until after the report has been defined. That is, the manner in which a analytic report is defined provides for an automatically generated query. Once the report has been defined, the data to populate such a report is retrieved to build the document. The report specification is a complete description of a document according to the present invention. It contains all the structural and formatting information required to build and display the document. The report specification is composed of both a tree of reporting elements and a reference to a datasource described herein.

To create a report specification comprising, for example, XML tags, a user manipulates graphical objects as presented to a user at a graphical user interface (GUI), where the objects represent the available data at the datasource. Such manipulation can be by dragging and dropping the graphical objects onto the report while the user is building the report. The system and method of the present invention will generate the relevant query depending on where in the report an object is dropped.

Report then Query Structure

Figure 1B:
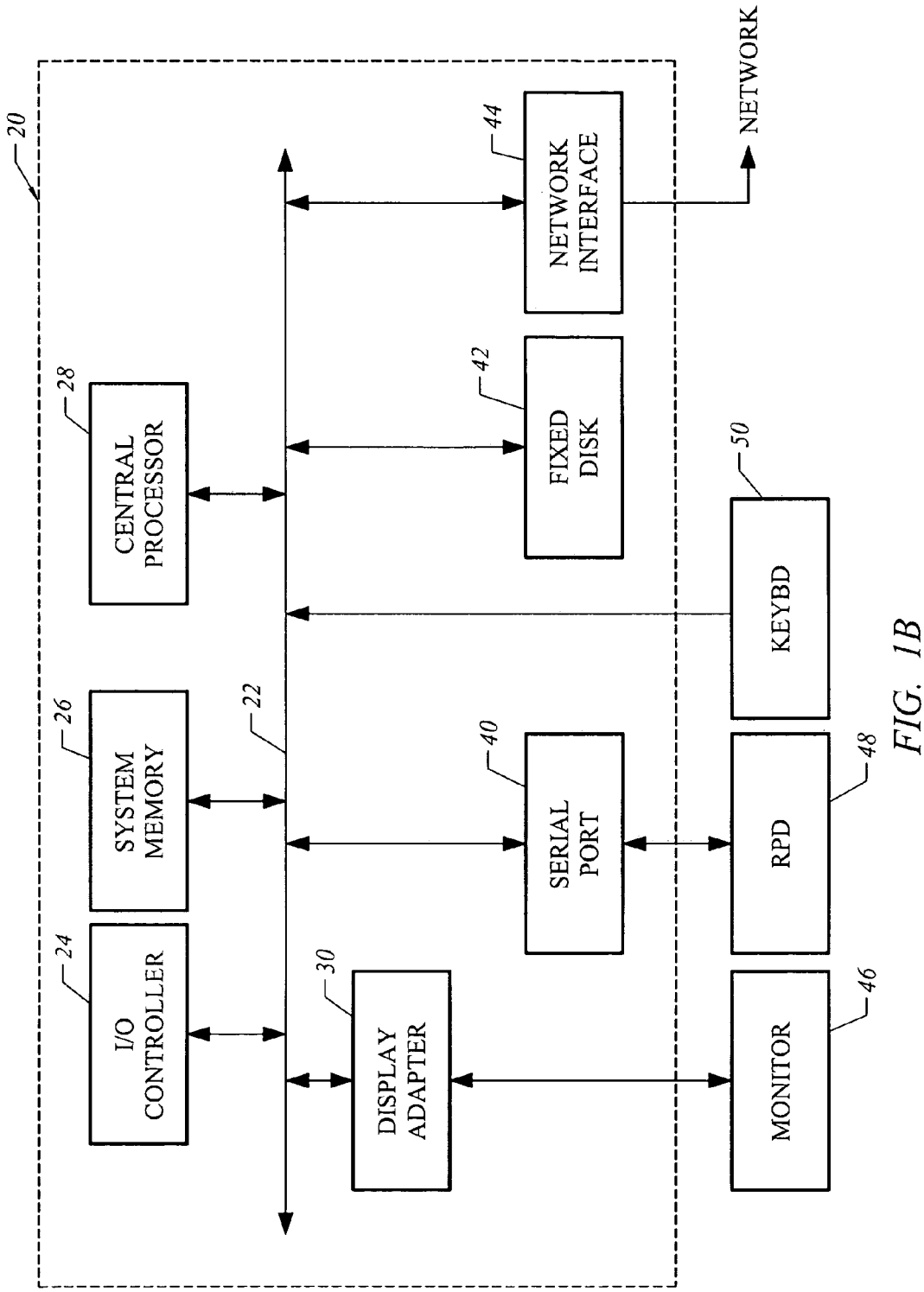
FIG. 1B shows basic subsystems in the computer system of FIG. 1A.
Figure 1C:
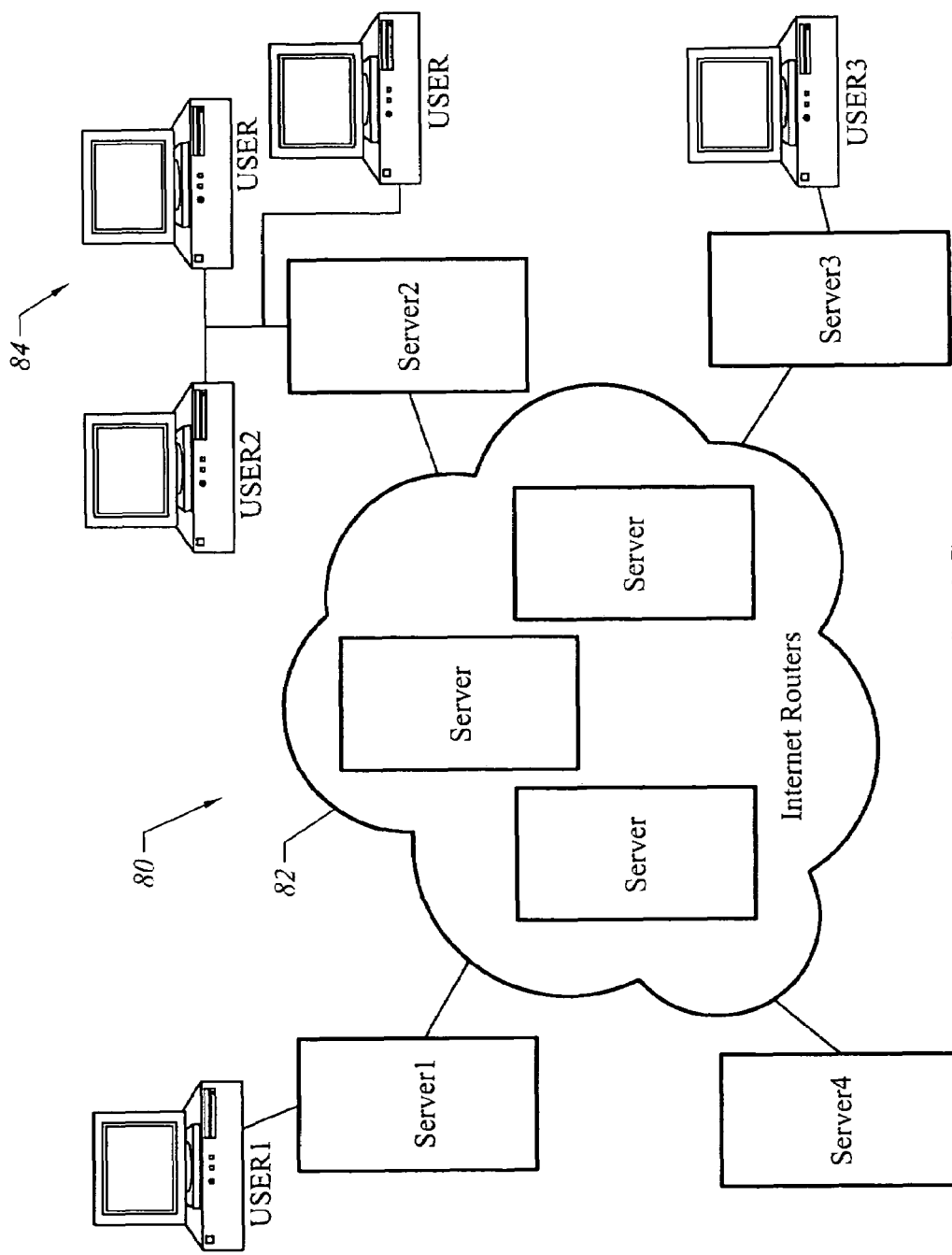
FIG. 1C is a generalized diagram of a typical computer network suitable for use with the present invention.

FIGS. 1A, 1B, and 1C illustrate basic hardware components suitable for practicing the present invention. FIG. 1A is an illustration of computer system 1 including display 3 having display screen 5. Cabinet 7 houses standard computer components (not shown) such as a disk drive, CDROM drive, display adapter, network card, random access memory (RAM), central processing unit (CPU), and other components, subsystems and devices. User input devices such as mouse 11 having buttons 13, and keyboard 9 are shown. Other user input devices such as a trackball, touch-screen, digitizing tablet, etc. can be used. In general, the computer system is illustrative of but one type of computer system, such as a desktop computer, suitable for use with the present invention. Computers can be configured with many different hardware components and can be made in many dimensions and styles (e.g., laptop, palmtop, pentop, server, workstation, mainframe). Any hardware platform suitable for performing the processing described herein is suitable for use with the present invention.

FIG. 1B illustrates subsystems that might typically be found in a computer such as computer 1. In FIG. 1B, subsystems within box 20 are directly interfaced to internal bus 22. Such subsystems typically are contained within the computer system such as within cabinet 7 of FIG. 1A. Subsystems include input/output (I/O) controller 24, System Memory (or random access memory "RAM") 26, central processing unit CPU 28, Display Adapter 30, Serial Port 40, Fixed Disk 42, Network Interface Adapter 44, which in turn is coupled electrically to a network. The use of bus 22 allows each of the subsystems to transfer data among subsystems and, most importantly, with the CPU, where the CPU might be a Sparc, an Intel CPU, a PowerPC, or the like. External devices can communicate with the CPU or other subsystems via bus 22 by interfacing with a subsystem on the bus. Thus, Monitor 46 connects with Display Adapter 30, a relative pointing device (e.g., a mouse) connects through Serial Port 40. Some devices such as Keyboard 50 can communicate with the CPU by direct means without using the main data bus as, for example, via an interrupt controller and associated registers.

As with the external physical configuration shown in FIG. 1A, many subsystem configurations are possible. FIG. 1B is illustrative of but one suitable configuration. Subsystems, components or devices other than those shown in FIG. 1B can be added. A suitable computer system can be achieved without using all of the subsystems shown in FIG. 11B. For example, a standalone computer need not be coupled to a network so Network Interface 44 would not be required. Other subsystems such as a CDROM drive, graphics accelerator, etc. can be included in the configuration without affecting the performance of the system of the present invention.

FIG. 1C is a generalized diagram of a typical network that might be used to practice an embodiment of the present invention. In FIG. 1C, network system 80 includes several local networks coupled to the Internet. Although specific network protocols, physical layers, topologies, and other network properties are presented herein, the present invention is suitable for use with any network.

In FIG. 1C, computer USER1 is connected to Server1, wherein the connection can be by a network, such as Ethernet, Asynchronous Transfer Mode, IEEE standard 1553 bus, modem connection, Universal Serial Bus, etc. The communication link need not be a wire but can be infrared, radio wave transmission, etc. Server1 is coupled to the Internet. The Internet is shown symbolically as a collection of server routers 82. Note that the use of the Internet for distribution or communication of information is not strictly necessary to practice the present invention but is merely used to illustrate a specific embodiment, below. Further, the use of server computers and the designation of server and client machines is not crucial to an implementation of the present invention. USER1 Computer can be connected directly to the Internet. Server1's connection to the Internet is typically by a relatively high bandwidth transmission medium such as a T1 or T3 line, although it might be in a similar fashion as connected to USER1. Similarly, other computers 84 are shown utilizing a local network at a different location from USER1 Computer. The computers at 84 are coupled to the Internet via Server2. USER3 and Server3 represent yet a third installation.

Figure 2:
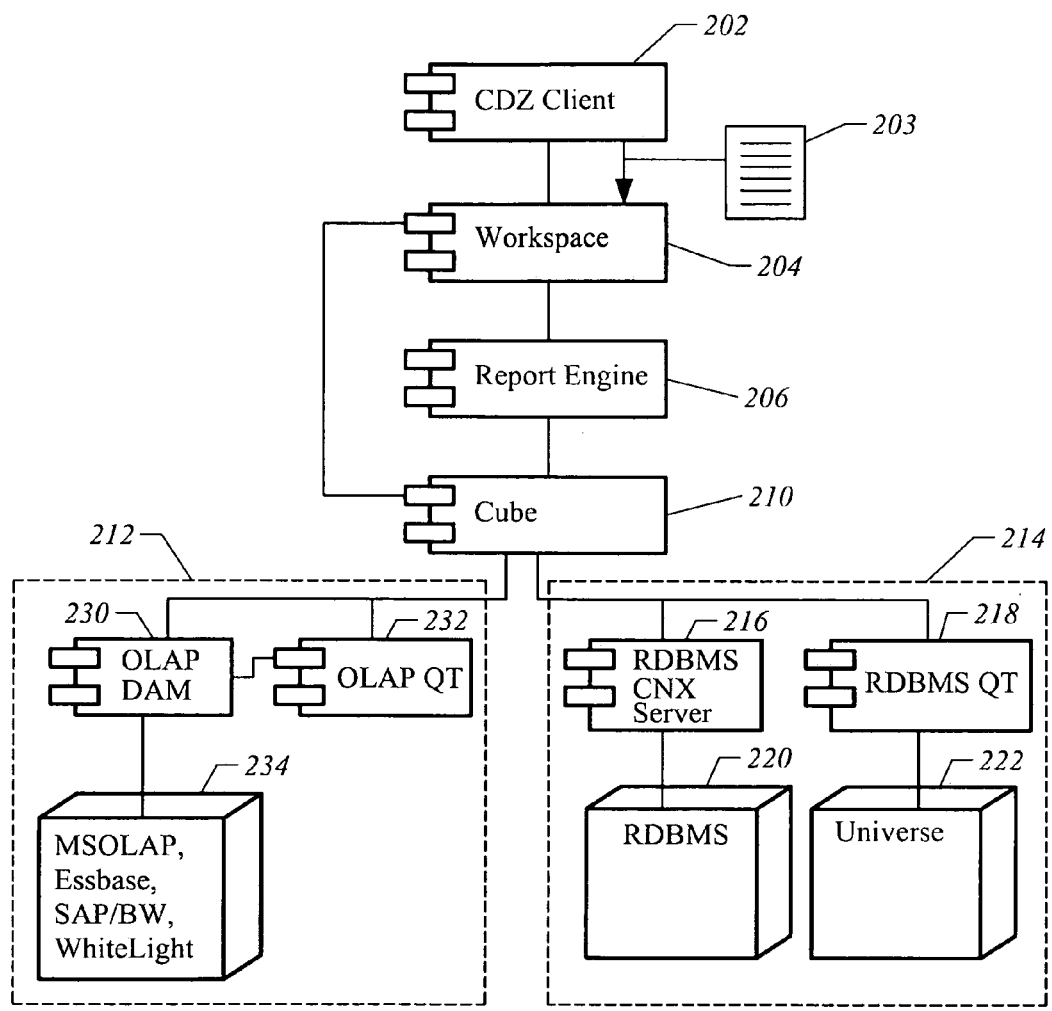
FIG. 2 is a simplified block diagram of the system architecture according to a specific embodiment.

FIG. 2 illustrates an exemplary system used in generating a report with the new metaphor "report, then query," as described herein, and is generally referred to as the Cadenza system. Each of the items shown in FIG. 2 may be implemented in hardware, software, of the combination thereof. Furthermore, each item might be configured in one computing device or may be spread over more than one computing device, for example, in a distributed computer network.

Client 202 provides a user interface for a user to initiate report creation according to the present invention. Client 202 is, for example, a computer system as shown in FIGS. 1A and 1B, or as USER1 configured to first perform a request to create a report, and thereafter perform a query action, wherein the user interface is a browser and the report generation tools (e.g., proprietary application software) and data (e.g., stored multidimensional database) are at Server 3, for instance.

The user interface of client 202 provides a user with the ability to build a report by graphically dragging and dropping reporting objects (e.g., Section, Table, Crosstab) and metadata objects (e.g., Dimensions, Hierarchies, Levels, Members) onto a report. An exemplary user interface can be provided by an applet, an ActiveX component, a full-client application, server-hosted client, or the like.

It presents the user with the Cadenza report objects available in the data source, and lets the user visually builds report by dragging and dropping objects (e.g., metadata objects) and reporting objects (e.g., Sections, Tables, Crosstabs, Cells) onto a report sheet (i.e., Report), wherein such objects are represented by graphic icons, or the like, as is well known in the art.

In operation, client 202 is configured to generate, or caused to be generated, report specification 203 which describes the content of the desired report. A report specification is, for example, a computer program containing a set of instructions, wherein at least one of the instructions is graphically represented by a reporting object which is used to create report specification 203.

Client 202 is configured to at least provide report specification 203 to report engine 206 via Workspace 204. In another embodiment, client 202 is configured to present to a user a text editor to input XML tags, for example, to create a report specification 203.

Workspace 204 provides the infrastructure necessary for client 202 to communicate with report engine 206. For example, workspace 204 stores user-defined metadata as well as other types of metadata. Such metadata is used by report engine 206 to build metadata objects. Metadata objects are objects that define a data source, such as a Universe (i.e., class, dimension, detail, measure, member) and an OLAP (dimension, level, hierarchy, member, and measure). Workspace 204 provides direct access to data source metadata (e.g., dimensions, levels, members) via a cube. Workspace 204 also includes a dictionary of metadata information for use by report engine 206 when creating a report.

Report engine 206 is electrically coupled to workspace 204 to receive information from client 202. Report engine 206 does not process data, but rather operates to process the form of report layout (e.g., font, border, color) as presented to the user interface (or as with a format of a file). That is, report engine 206 extracts layout information from the report specification, for example, by parsing the XML instructions from the report specification. After extracting information, report engine 206 builds a hierarchical tree of reporting objects. The tree and its reporting objects thereof describe the layout and structure of the report in terms of presentation objects (sections, tables, cells, etc). Each of the reporting objects includes a reference to a Cadenza datasource to deduce the necessary data to be queried after the report is created. Report engine 206 creates a DataSource Query (DSQuery) consisting of a tree of BlockQueries and provides the DSQuery to cube 210.

Report engine 206 eventually passes back reporting data to the client by, for example, determining the presentation range (e.g., clipping out what cannot fit in the page), requesting data from the Navigator (interface to report engine) provided by the next component, and sending this reporting data to the client as an XML stream (i.e., XML output).

Cube 210 generally manages metadata retrieval and query execution and is configured to receive from report engine 206, among other data, a DataSource Query. A DataSource Query is used to access and retrieve data from OLAP 212 and RDBMS 214 datasources. Cube 210 also retrieves and store metadata for local processing, as necessary to generate a report.

Figure 3:
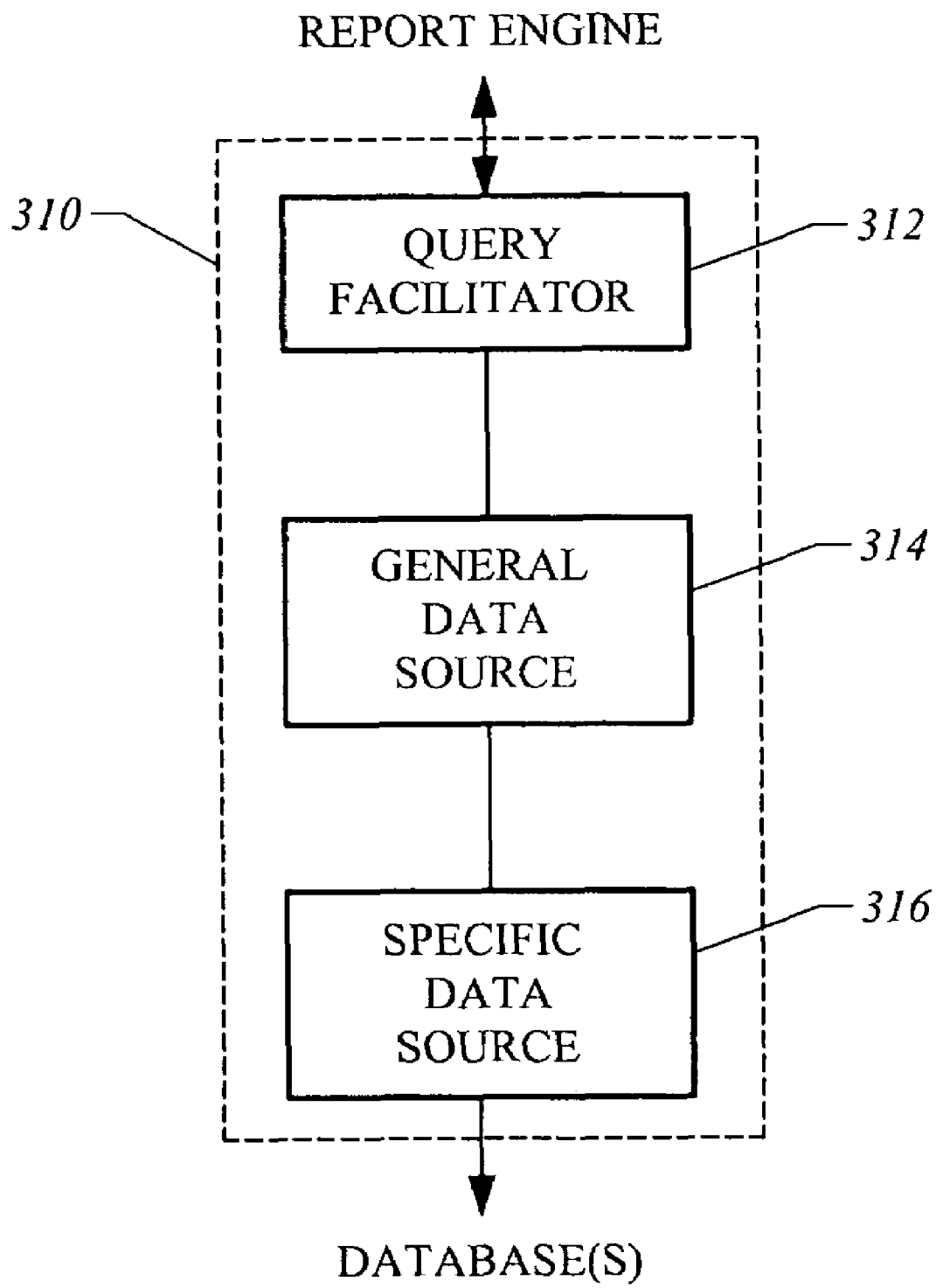
FIG. 3 is a simplified block diagram detailing further the cube of FIG. 2.

FIG. 3 depicts an exemplary structure for cube 210. Exemplary cube 310 includes query facility 312, generic data source 314 and specific data source 316. Query facility 312 defines a query using data source-neutral terms and builds the cube structure (i.e., multidimensional data structure) that will later be used to build a Cadenza Cube (not shown).

A Cadenza Cube is created by combining a cube structure and location of materialized DataSpaces in the compound database. Also, a Cadenza Cube is a cube structure consisting of a tree of nodes, where a node's coordinate system is derived from the reporting objects and axes in a report, as provided by a report specification. The Cadenza Cube, however, also consists is referenced to the materialized data stored in compound database.

A compound database supplies data and processing necessary to populate a report, such as static and index nodes. Static nodes contain data and information on how it was obtained, while index nodes reference other nodes in the compound database. The compound database performs the local processing that maps the results for the queries to expected results in the report.

The Cube Structure will later be used to build the Cadenza Cube which will be used by the navigator (not shown) to provide report engine 206 with access to data. A navigator in the art is a term used to describe the process employed by users to explore a cube interactively by drilling, rotating, and screening, for example.

Query facility 312 builds DataSpace Expressions (DSEs) describing the data required by each node in the cube structure. DataSpace Expressions for the reporting objects are built using the DataSpace and Formula Language Expressions in the DSQuery.

Query facility 312 flattens DataSpace Expressions using members inherited from ancestor BlockQuery (or, alternatively "QueryBlocks"). The flattened DataSpace Expressions also might contain sort and break information. DataSpace Expressions are flattened because conventional physical data sources, such as a RDBMS servers, are not adapted to handle data in a cube structure. Query facility 312 then sends the flattened DSEs to Generic DataSource (GDS) 314.

Generic DataSource 314 is configured to receive a DataSource Expression from query facility 312 and is an abstraction layer on top of the actual data. Generic DataSource 314 optimizes the query, in data source-neutral terms, by transforming the DataSpace Expression into DataSpace Definitions (DSDs).

Generic DataSource 314 presents data as a multidimensional cube called the Cadenza DataSource, against which a Computation Plan is run. Generic DataSource 314 processes the Computation Plan, as well as information provided by the Specific DataSource and the Compound Database components. Generic DataSource 314 output is a set of queries to be processed by Specific DataSource 316 component, and a computation tree to be processed by the Compound Database, where the terminal nodes are the raw data retrieved by the previous queries.

Based on the data already retrieved (or to be retrieved), and depending on the computational capabilities of Specific DataSource 316, Generic DataSource 314 will build a list of queries based on the Computation Plan that optimizes re-use and leverages the database server's capabilities.

According to another embodiment of the present invention, Generic DataSource 314 determines if any DataSpace defined by a requested DataSpace Definitions has already been retrieved by a previous query. This removes redundancies by comparing the transformation of requested query against transformation of previously retrieved DataSpaces. If transformations match, a new DataSpace Definitions is calculated as follows: DSDnew=DSDrequested−DSDretrieved.

Generic DataSource 314 is configured to transform DataSpace Definitions back into DataSpace Expressions which are sent to Specific DataSource (SDS) 316 and Generic DataSource 314. It should be noted that Generic DataSource 314 does not push sort or breaks to SDS queries.

Specific DataSource 316 operates to perform queries that are either directed to a relational database (e.g., through Business Objects Query Technique or QT) or to an OLAP database (e.g., through Business Objects OLAP access technology). Thus, Specific DataSource 316 functions to retrieve data that is specified by the queries, possibly executing some operation on a server. This data is transmitted to the compound database.

To perform such queries, Specific DataSource 316 uses the semantic layer to create a data source-specific query. For example, the query provided by Specific DataSource 316 might be in SQL to access an associated database to retrieve data. If Specific DataSource 316 is accessing a relational data source 214 as shown in FIG. 2, then Specific DataSource 316 creates a query using RDBMS Query Techniques 218 to obtain metadata from Universe 222. For example, Specific DataSource 316 sends a query to the physical data source 220 via RDBMS Connection Server 216. RDBMS Connection Servers 216 provide connections for executing queries against RDBMSs.

If Specific DataSource 316 is accessing multi-dimensional data source 212 of FIG. 2, then Specific DataSource 316 accesses data from multidimensional servers 234 using the OLAP Data Access Model (DAM) 230. OLAP Data Access Model 230 provides connections to physical data sources 234 (i.e., multi-dimensional servers) for executing queries. Such queries are created by using OLAP Query Techniques (QT) 232, which provides a semantic layer for building multi-dimensional queries.

Report then Query Reporting Model

Figure 4:
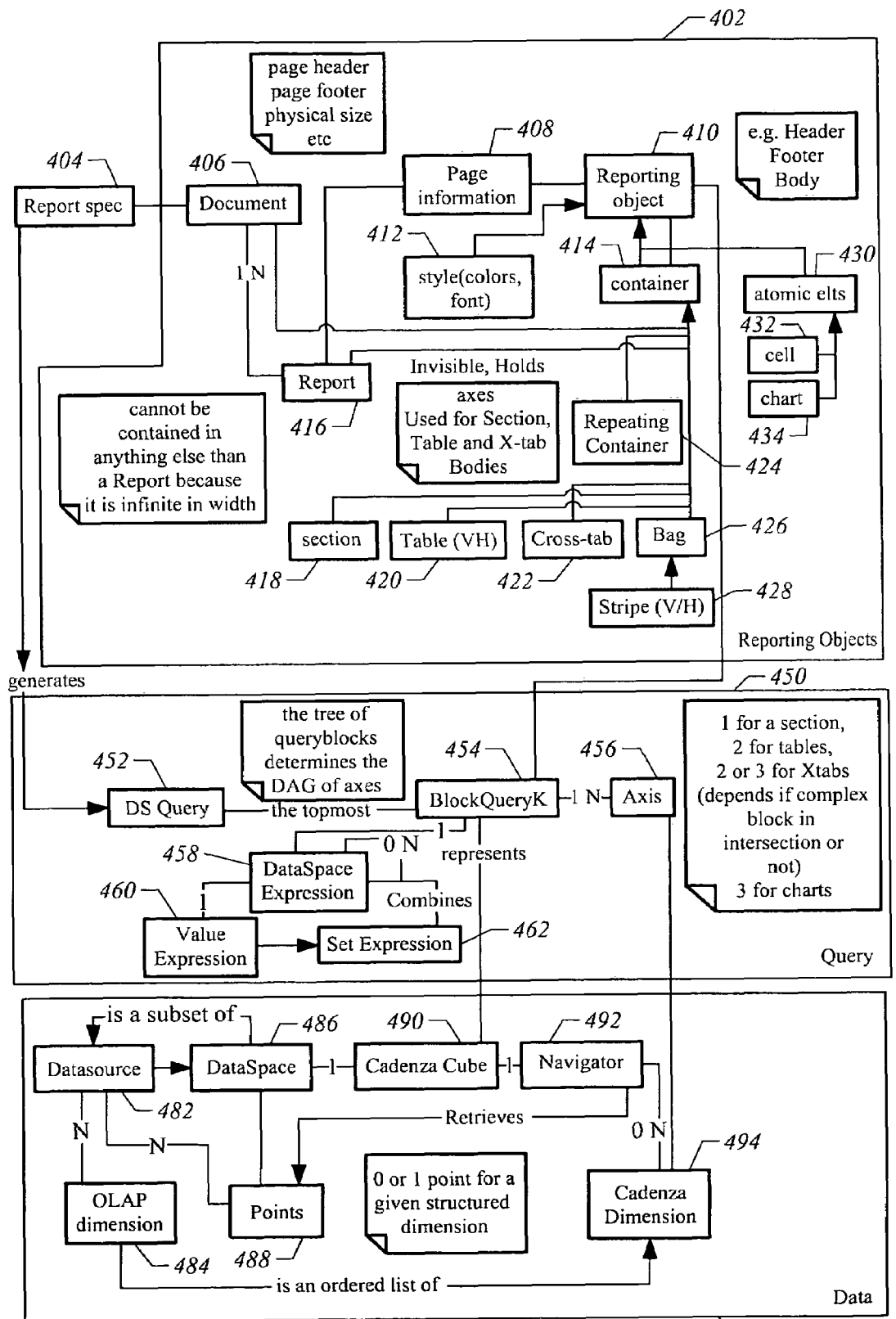
FIG. 4 is a diagram indicating three layers of abstraction according to an exemplary reporting model of the present invention.

FIG. 4 depicts three different layers of abstractions representing an exemplary static reporting model according to the present invention, from the closest to user to the closest to data. First, report engine 206 of FIG. 2 provides a tree hierarchy of reporting objects 402 that describes the structure of the report as perceived by the user. Second, BlockQuery 450 are associated to reporting objects 450 and organized along a similar tree structure. They specify Axes 456 and DataSpace Expressions 458 which are used to retrieve, compute, and display the data to a user interface, or to format the data in whatever form is necessary (e.g., formatting the data in a report as filed on a computer medium or printed on paper, or similar formats). Third, Cadenza cube definitions 490 are associated to BlockQuery 454 and are organized along a similar tree, Cadenza cube is referred to herein as a cube. These cube definitions 490 will specify actual data that comes from a DataSpace 486, a subset of points 488 in the Cadenza DataSource 482. Report engine 206 of FIG. 2 then can access this data using, for example, a Navigator.

Three layers 402, 450 and 480 are linked as follows. Each unique BlockQuery is associated to every Reporting Object. The dependency network that relates BlockQueries together is directly deduced from the one that relates Reporting Objects together. A set of Cadenza cubes is associated to every BlockQuery. This set is built using the data definition contained within the BlockQuery. Each member of this set represents data displayed by an instance of associated reporting object 410.

The report specification, as described above, is a complete description of document 406 of the present invention. Document 406 includes representation of all the structural and formatting information required to build and display the document. The report specification is comprised of a tree of reporting elements and a reference to Cadenza DataSource 482. Given a report specification, the Cadenza system is able to query data source 482, retrieve the data and build the document. A report specification persists, for example, as a human-legible XML stream.

Reporting object 410 represents a piece of significant and homogeneous reporting information, extracted or computed from data in Cadenza DataSource 482, and specifies how this information must be displayed. The data can, and often does, embed other reporting objects of layer 402. The topmost reporting object (i.e., the root) is document 406. The reporting context for particular reporting object 410 is defined as the path from the root to this object.

Each reporting object 410 is associated to BlockQuery 454. BlockQuery 454 may contain Axes 456 and/or DataSpace Expressions 458. BlockQuery 454 helps define Cadenza cube definition 492 that will actually be computed and displayed for each instance of reporting object 410, depending on its reporting context. For example, when a user creates a document, such a document contains a list of countries in a particular section. First, Section 418 (a Reporting Object) is added, for example by a drag and drop operation, to document 406. This adds the country level to this section 418. This defines underlying Cadenza cube definition 490 with one dimension that iterates over the members of the country level. As another example, Cell 432 also defines underlying Cadenza cube definition 490, which is restricted to single point 488 and has no dimensions 484. It should be noted that if several points are specified by corresponding BlockQuery 454, they will be implicitly, and locally, aggregated. And if this is not possible, the aggregation will result in a "#multivalue" error, for example. This may happen with dimension 494 that has no default member. The reporting context and BlockQuery 454 of a reporting object 410 are necessary to compute Cadenza cube definitions 480 underlying each of its instances.

Exemplary reporting object 410 and its elements of layer 402 correspond to an actual C++ class. The actual class of reporting object 410, such as Section 418, table 420 or Cell 432, will dictate the graphical behavior of its instances. Additionally, reporting object 410 can refer to a Style 412, which specifies information such as fonts or colors to be used. FIG. 6 illustrates exemplary reporting objects 602 and each of reporting objects' function 604 and associated characteristics 606.

In a specific embodiment, a graphical object is associated with each instance of reporting object 410 of FIG. 4 for use in a user interface to generate report specification 404. Thus, when table 420 is inserted in the body of Section 418, an instance of table 420 will be created for each value in Section 418. Each instance of reporting object 410 furthermore is associated with Cadenza cube definition 490 that contains the data presented.

The reporting context for particular reporting object 410 is defined as the hierarchical path from the root to this object. For example, table 420 that describes the revenue per product (e.g., not considering displaying the product captions) has BlockQuery 454 that defines a Cube with one dimension 494 (e.g., the products), points 488 of which are the values of the revenue for each product, and for the "current member" (e.g., guided by the context) of the Geography dimension 494.

If table 420 is placed at the top level in report 416, the set of members of Geography dimension 494 on which the aggregate values is reduced to its default member (usually 'all') and only one instance of table 420 will be created, providing the revenue for each product and all geographies. The cube underlying this instance is a slice of the Data Source that yields the aggregated revenue for each products and the default member for all other dimensions. Now, if the same table 420 is placed in the body of Section 418 that iterates over countries, one instance of table 420 and its underlying cube will be created for each of the countries. Since no member in geography dimension 494 is mentioned in the Table's BlockQuery 454, the member to consider for dimension 494 in each instance will be taken as the current member of the country level. The cube underlying each instance of table 420 will be a one-dimension cube providing the revenue for each product aggregated on the current country member. This cube will be accessible as point 488 in the one-dimension Cube that underlies Section 418 and iterates over countries.

Document 406 is a reporting object itself and can only contain reports 416. All reports 416 in document 406 are based on the same DataSource 482. Document 406 is a non-repeating container (not shown), and hierarchically, it is the topmost reporting object within 402. That is, a non-repeating container is a container that has no Axis 456 (e.g., Documents 406, Reports 416, Stripes 428). The reporting objects embedded into such a container are instantiated once and only once. Each instance will have an underlying Cadenza cube definition 490 that is a child of the cube that underlies the container's instance. Cadenza cube definition 490 has zero dimensions and therefore is a single collection of points 488. Most reporting objects graphically presented to a user (e.g., Tables 420, Crosstabs 422) are non-repeating containers. Therefore, Axes 456 and DataSpace Expressions 458 that a user associates to table 420 are associated to its repeating-containers 424 (e.g. Header, Body, Footer).

Report 416 can be a root of a tree of reporting objects. Report 416 is typically presented to the user as a set of pages 408 (possibly only one). Report 416 is contained by document 406. Report 416 is a non-repeating container. Container 424 is reporting object 410 that can contain other reporting objects 410. For example, the body of table 420 usually contains horizontal repeating stripe 428 of cells; thus, it is a container. Table 420 also typically contains stripe 428 of cells that form its header, and another one that forms its footer. Apart from cells 434 and charts 434, all Reporting Objects are containers.

Bag 426 is a particular form of non-repeating container where a user can store several objects 410. Stripes 428 are bags that has all instances of the contained objects that will be aligned either vertically or horizontally. Bags 426 usually do not have DataSpace expression 458 attached, but this is not a rule. Bags 426, however, do not have Axes 456.

Cell 432 is a terminal (i.e. non-container) reporting object that displays any scalar value (string, numeric, date, blob, etc). Depending on the type of cell 432, the semantics of the value it displays may be interpreted differently and the graphical behavior may be different. For example, some cells 432 will interpret a string as a URL and allow for navigation, while others will interpret the string as a path to an image file, and display the image.

Cell 432 has no Axis and specifies Cadenza cube definition 490 that is reduced to single point 488. That is, it always is associated with a scalar value specified in a scalar expression. In the case where a computation of this point requires an invalid aggregation (since certain scalar values don't aggregate), cell 432 will contain, for example, a "#multi-value" error value.

Repeating container 424 (or Repeater) is container 414 with one or more Axes 456. Repeating container 424 embeds other reporting objects 410 and repeats them for each value of its Axes 456. When repeating container 424 contains another reporting object 410, one instance of the contained reporting object 410 will be built for each point in the container's underlying Cadenza cube definition 490. The cube that underlies each instance of the contained reporting object 410 will be considered as a child of the cube that underlies the repeating container's instance. For example, Section 418 is repeating container 424. Section 418 built on the level of countries will repeat its contents for each member in this level. The cube underlying section 418 will have one dimension 494 (the level of countries), and its children will be the cubes underlying the various instances of the section's body.

Body (not shown) is the usual name of one of the repeaters embedded within container 414. Table 420 typically has one repeater, its body. The body contains horizontal 428 that is repeated vertically. Crosstab 422 has a body that contains bag 426 or stripe 428 and repeats it both vertically and horizontally. For example, crosstab 422 also contains column and line headers that are repeaters with one axis. Crosstab 422 is responsible for synchronizing all contained repeaters when displayed. Note that container 414 may contain repeating objects other than its body.

Apart from documents 406, reports 416 and sections 416, any reporting object can be inserted into repeating container 424. For instance, one may insert chart 434 in the body of crosstab 422. In this case, one instance of the Chart will be displayed for each intersection of the Cross-tab's lines and columns.

Repeater 424 does not hold any graphical property, such as a height or a width. Also, repeater 424 is not mapped onto an actual object and each reporting object that contains one or more repeaters 424, such as a table 420 or crosstab 422, will actually implement the repeating behavior and decide how the various instances of the contained objects will be laid out. Depending on the number of axes 456, repeater 424, or more specifically, the object that contains the repeater will have the instances of its contents be repeated horizontally, vertically or both. Most often, repeater 424 contains stripe 428, which in turns contains several other objects.

Section 418 is container 414 that contains only one reporting object 410, and its body is defined by a band of infinite width and of specified height. This band will be repeated for each necessary instance of the body. Even though section 428 is not strictly speaking a repeating container because only its body is, and in practical terms, it is best referred to as a section's axis.

Table 420 is a non-repeating reporting object and contains five reporting objects as follows: a header stripe, a repeater, called its body (which in turn contains stripe 428), a footer stripe, a header bag, and a page footer bag. Table 420 specifies a DataSpace Expression 458, while its body specifies one axis 456. This is especially important to note the report's semantics (i.e., header and footer computation). Tables 420 with a nested axis, on the other hand, do iterate on every dimension that is included in the axis, including the dimension of measures. In this case, the header will carry labels such as "Country, Measure, Value."

Regarding page break (not shown), table 420 can specify a header and a footer to be used in case there would be a page break at some time during the table's display. Table 420 handles page breaks, and in a given context, only one instance of table 420 is created. Its header is displayed and then its body is repeated for each value in the table's axis. Lastly, the footer is displayed. If a page break is detected in the report creation process, table 420 will assume that several instances of itself has been created Each of these instances holds just enough data from axis 456 so as to fit in one page. One instance of the table's page footer will be displayed just after each table instance, and one instance of the page header will be displayed just before the second instance and the following ones.

Table 420 will "slice" its content so that only part of the data in the axis is displayed in each page. All computations that refer to axis 456, such as a sum or running sum, will be impacted visibly. In terms of reporting, everything will behave as if a user had created as many instances as necessary of the same table 420, each one having the right set of data in its axis 456.

Crosstab 422 is a complex non-repeating object that contains the following sub-components: a "linecol" header stripe, which contains the top left cell in the matrix; a "linecol" footer stripe, which contains the bottom right cell; at least four repeaters designating the column header, column footer, line header and line footer (each of these are associated with an axis and contains either an horizontal stripe (or lines) or a vertical stripe (or columns)); one repeater with two axes, the body containing a stripe; and a page header and a page footer. Crosstab 422 specifies DataSpace Expression 458 while its body and other Repeaters specifies the two axes. Crosstab 422 operates to synchronize all contained repeaters when displayed. The line headers and footers carry the first axis, the column headers and footers carry the second axis, and the body carries both axes. The page headers and footers are used in a way similar to how tables 420 handle page breaks.

Regarding table breaks and crosstab breaks, the reporting model described herein need not define such a concept to match the notion of break as defined in Business Objects products, since it is possible to insert tables in tables 420 or crosstabs into crosstabs 422. For example, consider table 420 that lists products, countries and revenue, with a break on products with the aggregated revenue in the footer. The equivalent construction in a Cadenza system would be table 420 that iterates over products. The header of table 420 contains the captions "Product," "Country," and "Revenue." The body of table 420 contains two elements: a caption for the current product and a contained table 420 that yields all the countries and the respective revenue. The footer of this contained table itself contains the aggregated revenue for all countries. A similar mechanism could be used to support vertical and horizontal breaks in crosstabs 422. The user interface according to the present invention will allow users to create breaks without having knowledge of this construction. The break in itself, however, is not a component of the Cadenza reporting model.

BlockQuery Layer 450 includes DataSource Query 452 created, for example, by the report engine builds and sends DataSource Query 452 to Query Facility 312 of FIG. 3. DataSource Query 452 contains the (DSQuery) information necessary to build a query of the REPORT, THEN QUERY process.

BlockQuery 454, which operates to maps each of reporting objects 410 to a node in the Cadenza cube. BlockQuery 454, together with its ancestors and children, holds the contextual definition of the Cadenza cubes associated to each instance of reporting object 410. Each reporting object has its own BlockQuery. A DSQuery (i.e., a hierarchy of BlockQuerys) is built based on the Report Specification. The BlockQuery context is the path from the root to BlockQuery 454 itself.

Exemplary BlockQuery 454 is associated with a number of axes (i.e., zero or more), which describe a node that corresponds to the reporting object in the cube structure. BlockQuery 454 also includes a DataSpace Expression that specifies the DataSpace attached to the node, as well as an optional DataSpace Expression. The optional DataSpace Expression specifies a larger set of points than displayed in the report 416 and can be used to capture a "scope of analysis" and enable drill-down functionality as described in Ser. No. 09/824,654.

Exemplary set expression 462 specifies a list of members of a dimension. DataSpace expressions 458 are formed using set expressions 462. The syntax for set expressions 462 is easily determinable by one having ordinary skill in the art since it need contain only traditional set-algebraic operators and constants, where constants are described as dimension members herein. Such syntax references to the contextually determined "current member" for any dimension of a Extended Data Source. For example, the following are permissible set expressions 462: {Geography.France}, which is a set with one member, a constant; and Union (Geography.CurrentMember.Country.Cities, Geography. France. Paris), which is the set of cities in the current country to which Paris is added.

To specify dimension members (i.e., constants), set expression 462 also refers to a dimension property (not shown) of other dimensions members. For instance, if each "product" has a property describing its "country of origin," then "Product.CurrentMember.Country" defines a valid member for the Geography Dimension.

Set expressions 462 allow the use of complex formulas, involving various properties of various dimension members (either constant or contextual) and complex calculations, which are described as value expressions herein. Value expressions 460 yield a scalar value or no value and implicitly specifies one member of the dimension of scalars. For example, ToUpper(Time.CurrentMember.Caption) & ToString(Measure.CurrentMember.Value/100) is such a value expression. Typically, value expressions 460 are used within the BlockQuerys of cells 432 and charts 434, or used to specify filters. For performance reasons, calculated members are used as much as possible.

DataSpace Expression (DSE) 458 partially specifies the DataSpace 486 attached to BlockQuery 454. According to the present invention, ancestors and children of BlockQuery 454 are used deduce DataSpace 486. The simplest form of DataSpace Expression 458 is obtained by specifying one set expression 482 for each of the dimensions of the Extended Data Source, such that if no set expression 482 is provided for a given dimension, the default is "Dimension.Current-Member." For instance, if the Original Data Source has three dimensions (Geography, Time and Measures), an exemplary DataSpace Expression is:

```
DS{
    Geography:   {France, US}
    Time:        Time.All
    Measure:     Current
    Scalar:      Value
}
```

This DataSpace Expression specifies a set of points in the Extended Data Source that have one of the mentioned constants as a coordinate in the geography dimension, that have the "all" member as a coordinate in the time dimension, and of which the coordinate in the measures dimension will be determined by the context. All points have a value. If a combination of coordinates does not yield any value, there is no point for this combination of coordinates in the Extended Data Source. So, DataSpace 486 may contain "holes" even though its definitions make it appear as a complete cube of data.

It is noted that a DataSpace Expression 458 alone is not sufficient to determine a physical DataSpace 486. Only a DataSpace Expression 458 in a given context, along with the DataSpace Expressions 458 of all its embedded and containing BlockQuerys 454, can entirely define DataSpace 486. In the example above, the measure to be retrieved is deduced, according to the present invention, from the Block-Query context.

Cell 432 will normally specify set expression 462 for the dimension of measures and for the dimension of scalars, whereas other reporting objects do not specify any. A typical cell 432 may contain a formula such as "Revenue" as shown in the following DataSpace Expression 458:

```
CellDS {
    Geography:   Current
    Time:        Current
    Measure:     Revenue
    Scalar:      Value
}
```

DataSpace Expressions 486 also can be combined together by union, intersection and other set computation operators to produce more complex DataSpace Expressions 458.

An important means of defining DataSpaces 486 is through the use of Filter DataSpaces and a Projection operator. The syntax of the Projection operator is: <Axis> of <DataSpace>, where <Axis> is an Axis, and <DataSpace> is either the name of another DataSpace Expression 458, or another DataSpace Expression 458 directly. A projection example is as follows:

```
(Geo, Time) of {
    Geo:         Countries. Members
    Time:        {95, 96}
    Measure:     Revenue
    Scalar:      Value
}
```

First, an intermediary DataSpace 486 that corresponds to a Filter DataSpace expression is built to contain the revenue for all countries for the years 95 and 96. Then, the result is projected as a collection of points onto the axis (e.g., Geo, Time) resulting in a set tuples where revenue exists for a given country for the year 95 or 96.

As another example, a more complete DataSpace Expression 458 example:

```
DataSpace {
    Geo, Time:      (Geo, Time) of {// Filter
    Ceo:            Countries.Members
    Time:           {95, 96}
    Measure:        Revenue
    Scalar:         Value
    }
    Measure: None
    Scalar: Geo_Caption & Time_Caption
}
```

When DataSpace 486 involves a complex formula in the dimension of scalars, it can often be decomposed into a combination of simpler values coming from several sub-DataSpaces expressions. For example, the following DataSpace Expression 458 for a cell which computes the revenue during the current period of time minus the losses during the previous one, for a given member of the geography:

```
CellDS{
    Geography:      Current
    Time:           Current
    Measure:        None
    Scalar:         (Revenue, Time) – (Losses, Time.Prec)
}
```

DataSpace 486 is a subset of points taken from Datasource 482, which is described herein as Extended Data Source. DataSpace 486 can be the entire Extended Data Source, and it may be a "cube," or not. DataSpace 486 represents the set of actual, physical data that will have to be retrieved by querying the "real" DataSource of shown in FIG. 2 as relational data source 214 or multi-dimensional data source 212.

DataSpaces 486 may be combined together through various operations to produce new DataSpaces 486. The typical operations are the set-theoretic operations (union, intersection, difference, etc). But other important operations can be applied to DataSpaces 486, such as combining values. For example, assuming there is two DataSpaces 486, both of which contain points for each country. The first one is sliced on the year 1995, the "revenue" measure and on the default "value" member of the dimension of scalars. The second is sliced on the year 1994, the "losses" measure, and the "value" value expression 460. The two DataSpaces 486 can then be combined into a new DataSpaces 486 that contains points for each country, sliced on the "none" members for time and measure. The value of each point for a country is equal to the differences between the values in both original DataSpaces 486.

A projection operator is useful when expressing complex filters, and more generally when expressing a functional dependency on a dimension member. Projecting DataSpace 486 on one or more of its dimensions D1 . . . Dn is like building a new DataSpace 486 that contains only points for members d1 . . . dn in D1 . . . Dn such that there is at least one point of coordinates d1 . . . dn in the Original Data Source (e.g., the other coordinates that fully define the target DataSpace separately). For instance, assuming a DataSpace 486 is built that contains the revenue for all countries such that their profit is greater than their losses. First, a DataSpace 486 is built that corresponds to this condition. Then, a slice of the Extended Data Source is selected that corresponds to each country. Thus, the "all" member for the time dimension, the "none" member in the dimension of measures, and specify the value expression 460 of "Filter(Profit>Losses)" in the dimension of scalar.

Note that to build DataSpace 486, two simpler DataSpaces (the values of Profit and Losses for each country and all years) are combined and all points for which the condition does not hold are removed. Therefore, filtering the DataSpace does not necessarily contain a point for each country. Only those for which the condition is not filled will yield empty slots. Then, the filter is projected onto its geography dimensions. During this process, only the countries for which there actually is a point in filter DataSpace 486 will be provided. This projected set of countries is then used to specify the "geography" component of the target DataSpace 486 where the latter is sliced along the "Revenue" measure, the "All" member of the time dimension, and the "value" member of the dimension of scalars. Only those countries that match the condition are considered.

Cadenza cube 490, or, simply, "cube," extends the notion of an OLAP cube. Cadenza cube 490 includes a set of data organized along a tree of multi-dimensional structures. It represents the actual set of data that will populate a report. To each instance of reporting object 410 will correspond a cube that contains the data associated with the object and with the instances of all reporting objects contained in the object. The topmost Cadenza cube 490 which is attached to document 406 is called the Cadenza compound database cube (CDBCube). All other Cadenza cubes 490 will be sub-components of the Cadenza compound database cube. In order to display report 416, Cadenza report engine 206 of FIG. 2 will navigate the corresponding Cadenza compound database cube in the correct order. Building a Cadenza report from its report specification 404 equates to building the Cadenza compound database cube.

Note that variations of the cube, as discussed above, are possible. Data can be organized as a graph, array, or other arrangement of multi-dimensional structures. Other embodiments of the invention can use structures other than a "cube" to achieve the same functionality and features. Further, other embodiments may include different cube-to-cube relationships. For example, a system may have multiple compound database cubes, cubes containing cubes, etc. Many variations are possible.

Cadenza dimension 494 is a set of members or tuples that can be combined to define the coordinate system of Cadenza cube 490. Cadenza dimensions 494 contain and extend the concept of OLAP dimension, as follows. A first class of Cadenza dimensions 494 contains all the dimensions from the Extended Data Source (i.e, Flat Dimensions). Flat dimensions can be combined into nested dimensions, where a nested dimension is the Cartesian product of the basic dimensions that it combines, and its members are the tuples that contain members of each of the combined basic dimensions. A flat or nested dimension has a natural sort order that can be inherited from DataSource 482 or specified in the case of calculated or nested dimension. The expression that defines Cadenza dimension 494 is called an axis 456. Axis 456 is a list of flat dimensions to be combined, which could indicate sort order.

Figure 5:
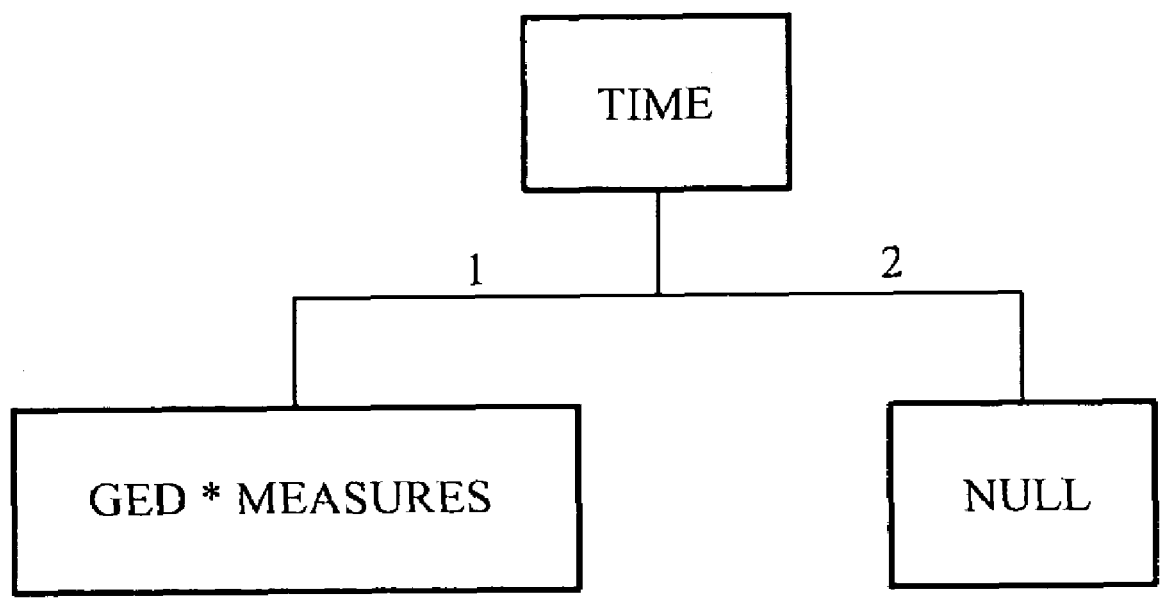
FIG. 5 depicts a simple block diagram representing an exemplary Cadenza cube structure.

Cadenza cube 490 is defined as the association of a cube structure and a set of physical DataSpaces 486. A Cube structure defines a class of homogeneous cubes. Navigator 492 is an interface to traverse the data contained in cubes 490. A cube structure is a tree whose nodes are sets of Cadenza dimensions 494. Navigating a cube consists in specifying coordinates for each of its dimensions 494, choosing one of the children cubes that are made available from this set of coordinates, and then navigating the child cube until a scalar value, or no value at all, is reached. Each node indicates what dimensions are used to access any of its children. From the topmost dimension, one can choose among several paths to access sub-cubes. An exemplary textual representation of a cube structure shown in FIG. 5 as Time [1: Geography, Measures; 2: Null].

Cadenza cube 490 is the association of a cube structure and a set of DataSpace 486. Cube 490 maps actual data in Extended Data Source 482 onto the cube structure in by first mapping each terminal node of the cube structure to DataSpace 486, where the DataSpaces 486 associated to different nodes may overlap. Second, each node with children is associated to the union of all its children's DataSpaces 486. Therefore, the DataSpace 486 associated to the root node is the union of all terminal DataSpaces.

Given any structured coordinate, cube 490 will yield zero or one point 488 in DataSpace 486. For example, starting from the root node's DataSpace 486, each time a part of the structured coordinate is specified, DataSpace 486 will be restricted to a subset that corresponds to this coordinate, and will be restricted further to DataSpace 486 that corresponds to the chosen child until a leaf is reached. That is, either there are no points left in the DataSpace (thus, no point exists in the Cadenza cube for this structured coordinate), or alternatively, one or more points 488 are left. If more than one point 488 remains, they are aggregated to return one value. If the aggregation is impossible, a "#multivalue" error is returned, for instance.

As another example, consider first DataSpace 486, which is DataSource 482 sliced on two elements of the time dimension, 1998 and 1999 (ignoring the extra dimensions of the Extended Data Source). Also consider two terminal nodes (hence also to the root node). A structured coordinate [99, 1: (US, Units Sold)] will yield the units sold in the US in 1999. The structured coordinate [99, 2] will yield the value of revenue (e.g., default measure) for all countries (e.g., default member) in 1999. A structured coordinate [95, 1: (US, Sales)] will yield nothing since there is no point in DataSpace 486 that has the coordinate "95" in time corresponding to the year 1995.

As a further example, consider the same DataSpace 486, but which is now sliced along the members "France" and "US" of the geography dimension. Interestingly, enough, the structured coordinate [99,2] will bring the aggregated revenue of France and US (because the "all" member of the geography dimension is not a coordinate of any point in DataSpace 486). In most reports, this may happen if geographies have been filtered. Lastly, consider DataSpace 486 that is sliced on the measures "Sales" and "Units Sold." The same structured coordinate [99, 2] will return a "#multivalue" error since aggregations on measures are not permitted.

There is a functional dependency of DataSpaces on structured coordinates. To each structured coordinate is associated a specific DataSpace 486. In many cases, as in all the examples above, DataSpace 486 associated to a coordinate in a dimension is obtained by slicing the overall DataSpace 486 along this member, which is the most frequent case. But, as will be explained below, more complex cases occur, where DataSpace 486 associated to a dimension member, for example, in a structured coordinate is deduced through complex operations such as filtering, value combination, etc.

"Report then Query" Report Creation

Figure 7:
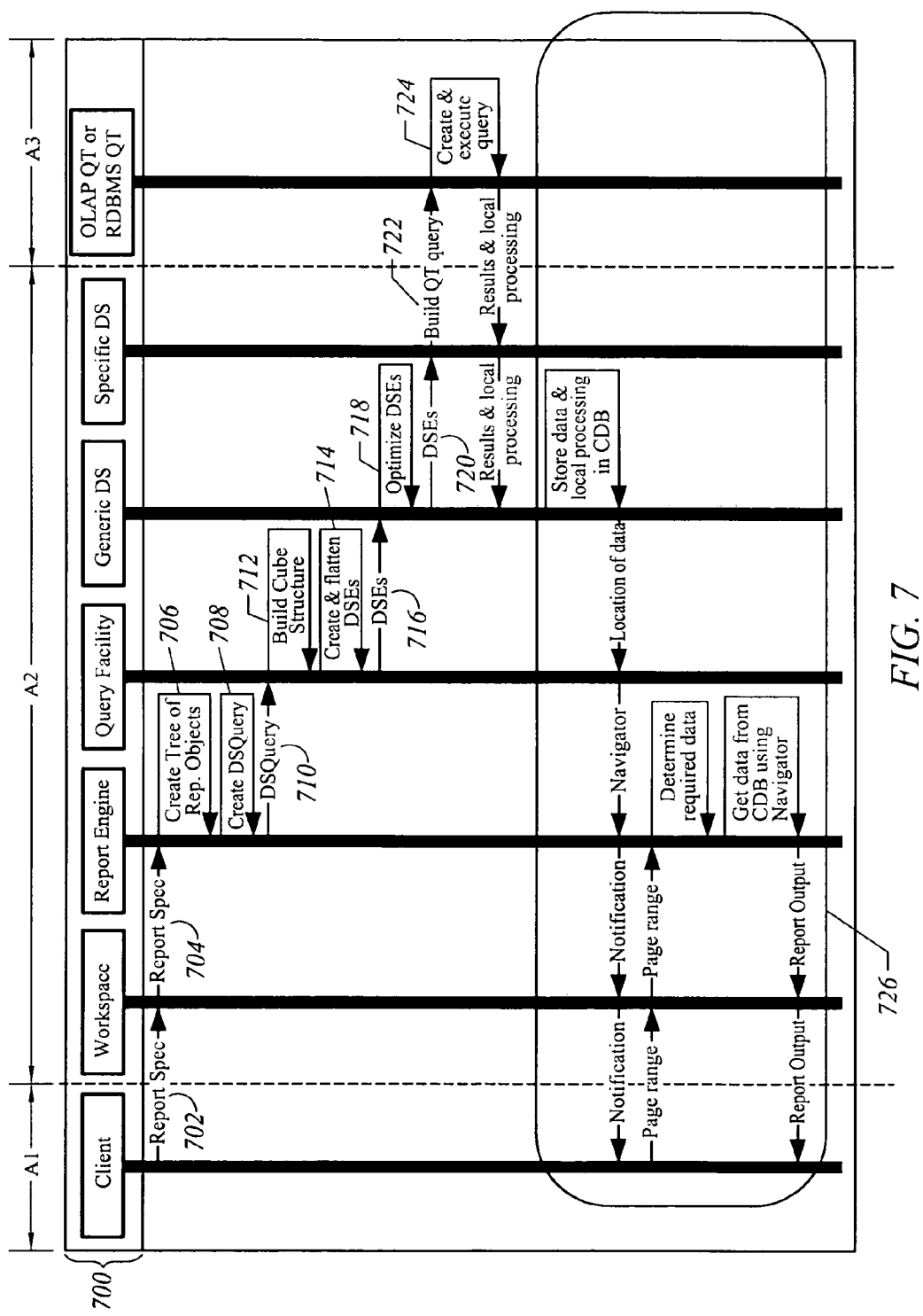
FIG. 7 is a diagram depicting a method of creating reports including the REPORT, THEN QUERY metaphor according to an embodiment of the present invention.

FIG. 7 illustrates an exemplary-method of report creation using the REPORT, THEN QUERY metaphor. One or more activities associated with elements 700 occur in one, two or three physical structures. More specifically, client activities might occur in structure A1 (e.g., thin client computing device), with the remainder of processes occurring in structure A2 and structure A3 (e.g., a remotely networked server). It is within the scope of the present invention, however, to configure structures A1 and A2 (e.g., client computer) to perform the associated processes, while the data source resides in structure A3, where A3 might be a remotely networked server database. Additionally, the entire report creation method might occur within a single computing device as described above in connection with FIGS. 1A and 1B.

At 702 a report specification is generated, for example, by receiving inputs from a user regardless of whether the inputs are associated with graphical representation or are textual inputs. Report specification creation might be performed by an applet, or a similar application program. The report specification created is, for example, a XML description of report sent from client to report engine. The report specification contains Graph, Axis, Style, Query, Page, and View, and other layout information that later is extracted from the report engine 206 for FIG. 2. A person having ordinary skill in the art should appreciate that other programming languages, other than XML, could be used create a report specification. According to the present invention, the report specification is not a traditional "query" performed in connection with a datasource, but rather the specification includes information associated with metadata, or metadata itself, for defining the types of data which should be deduced therefrom to perform a query. That is, a report is created first, and from the report, a query is generated by deducing the set of data to be required by the report. Hence, the metaphor REPORT, THEN QUERY. The present invention obviates the necessity to first define the set of data for a report (for example, as defined by a user), and then produce a report on top of the retrieve data.

At 704, the workspace receives the report specification and provides a dictionary of metadata objects. The dictionary provides an interface for accessing metadata, such as dimensions, hierarchies, levels, members, etc., and it stores user-defined metadata local to a Report. Workspace 704 also provides access to metadata from physical data source if the user prefers a report created by way of the conventional QUERY, THEN REPORT metaphor. In another embodiment, the Workspace 705 and its associated processes are removed from an exemplary Cadenza system without affecting the advantages provided by the present invention. That is, the report specification might be provided directly to the report engine by the client.

At 706, the report engine builds a hierarchical tree of reporting objects that describes the structure of the report as perceived by the user. The tree and its reporting objects thereof describe the layout and structure of the report in terms of presentation objects (sections, tables, cells, etc) rather than the data itself. For example, as shown in FIG. 4, an exemplary hierarchical tree of reporting objects includes Document 406, Report 416, Section 418, etc.

Figure 8:
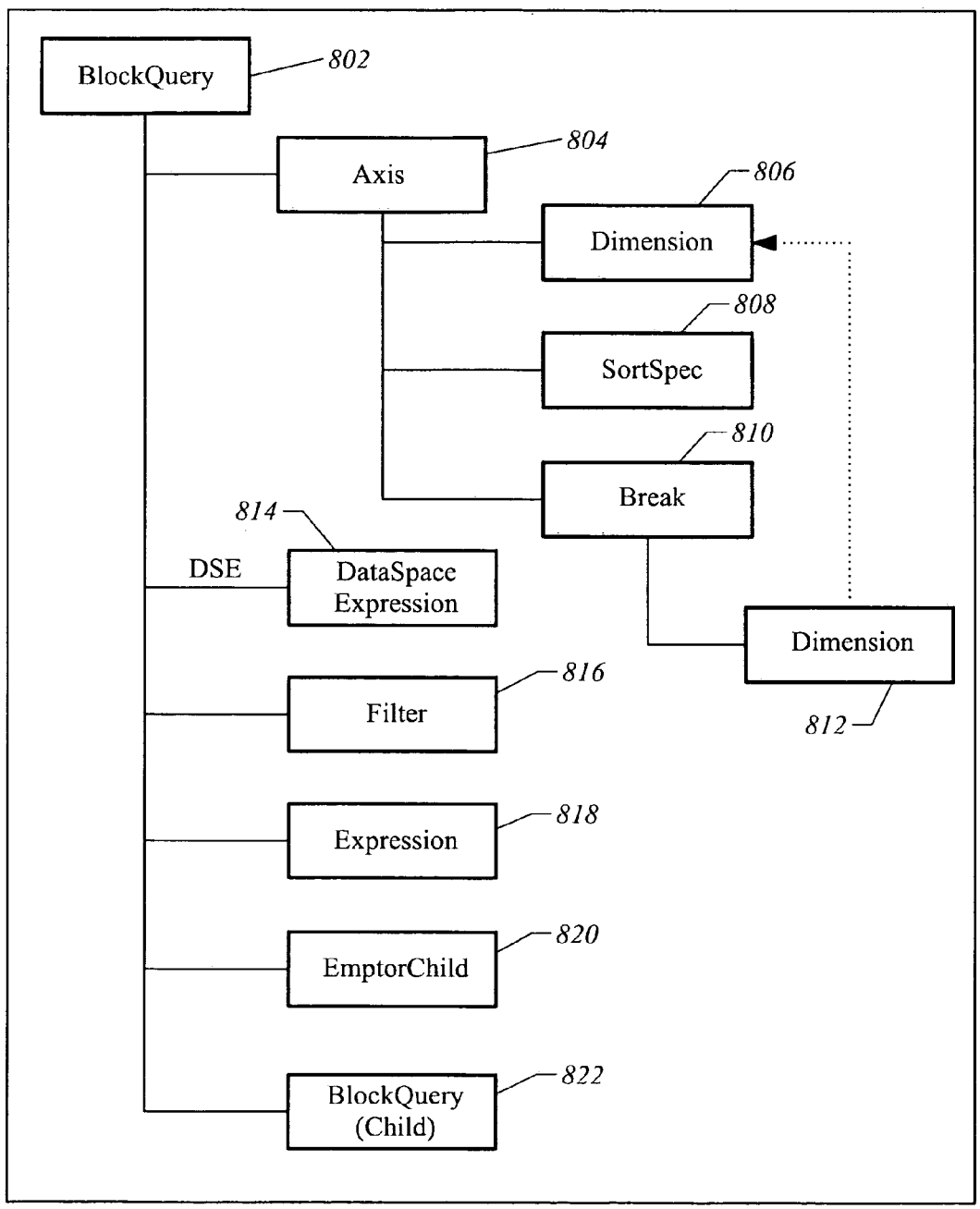
FIG. 8 is a simplified block diagram showing exemplary DataSource Query objects.

At 708, a DataSource Query is created by, for example, the report engine. As shown in FIG. 4, DataSource Query 452 is a hierarchy of Block Query(s) 454, as derived from report specification 404. Each BlockQuery maps each reporting object to a node of the Cadenza cube. As shown in FIG. 8, an exemplary BlockQuery 802 is a tree of DataSource Query objects including Axis 804, DataSpace Expression 814, Filter 816, Formula Language Expression 818, Emptor Child 820 and BlockQuery (Child) 822. Exemplary Axis object 814 includes zero or more dimensions 806, a sort specification 808 defining a priority of sorting, and zero or more breaks 810, where each break refers to one dimension listed in dimensions 812 under Axis 804.

DataSpace Expression 814 partially specifies a DataSpace (i.e., a subset of points taken from the Extended DataSource) attached to BlockQuery 802 for deducing the entire DataSpace, where the DataSpace represents the set of actual, physical data that will be retrieved by querying the "real" datasource. Emptor Child 820 defines the emptiness for BlockQuery 802 since a parent BlockQuery 802 can define one of its child BlockQueries 822. When an Emptor Child 820 contains no points, Parent BlockQuery 802 will be treated as empty and thus will not be displayed or presented to user in the form of report. At 710, the DataSource Query and its BlockQueries are provided to the Query Facility.

At 712, the Query Facility builds a logical cube structure from the data definition of each reporting object. The cube structure is a tree where each node refers to a set of Axes of a corresponding BlockQuery, and, for example, each arrow in indicates the BlockQuery containment relationship. Such a cube structure (i.e., Cadenza Cube) according to the present invention is a set of data organized along a tree of multi-dimensional structures which is used to populate a report.

At 714, the Query Facility creates one or more DataSource Expressions and then flattens the DataSource Expressions. Flattening DataSource Expressions or the cube structure into two dimensions is performed to accommodate data sources which are not multi-dimensional. That is, a cube cannot be used to define a query of a RDMBS server. At 716, the DataSource Expressions are provided to the Generic Data Source.

At 718, the Generic DataSource optimizes, or simplifies, the DataSource Expressions. A cube structure is optimized, for example, by removing any intermediate node that does not specify a dimension and connecting its children to its parent. All logical cubes associated with all reporting objects are merged, and thus optimized, to defined the minimal set of queries needed to extract all the data needed by all reporting objects. Optimized DataSource Expressions allow for incremental refresh of the created report as the user requests additional information after a cube has already been populated with a first query. Thus, there is no need to perform another query. In one embodiment, the optimization of DataSource Expressions is not performed and is bypassed. At 720, the optimized DataSource Expressions are provided to the Specific Data Source.

At 722, the Specific Data Source initiates a query of the specific physical data source that is, for example, a relational database (e.g., through Business Object's Query Technique), an OLAP database (e.g., through Business Objects OLAP access technology), an SQL database, or the like. The Specific Data Source thus retrieves data specified by the query. At 724, a query is then created and executed to retrieve the actual data residing in the physical data source.

Thereafter, the data is accessible to create the report in the processes of 726, which may or may not be similar to those processes known in the art.

FIGS. 9 through 13 illustrate report creation according an embodiment of the present invention. FIG. 9 depicts an exemplary report which a user creates using a graphic user interface (GUI) or by entering instructions into a text editor. For example, a user is presented with graphical representation (i.e., objects) of the following: a document, a report, a table, etc., as well as dimensions Time, Product, Geography, Customer, etc., and measure. Such graphical representations might be a pull-down menu, icons, or the like. By selecting, or "dragging and dropping" such graphical representations onto a workspace in an appropriate relationship with the other graphical representation, a report will created with data shown in FIG. 9.

If the user is inputting report generation characteristics on a GUI at a client computer, as shown in FIG. 1A or FIG. 1C, then a report specification is formed by appending instructions into a report specification file, where each instruction is associated with a graphical representation or other input provided by a user. In an exemplary report specification file comprised of XML instructions, a document table icon that is dragged and dropped onto a workspace is associated with an illustrative XML tag having the following form:

<!ELEMENT REPORT (Query, (HTABLE | . . . |CELL | . . . |+>

<!ATTLIST REPORT

BID (CDATA) #IMPLIED>

Other XML tags associated with the Report, Document, Cells, etc., are appended similarly into the report specification. Once the report has been defined, the report specification is provided to the report engine. In one embodiment, the report specification is created at a physical machine including the report engine. Hence, the report aspect of the REPORT, THEN QUERY metaphor has been performed.

FIG. 10 shows a reporting object layer having several reporting objects associated with the report specification received at the report engine. The Document contains only one report, and the report contains a table and a cell. A filter has been applied to the report so as to select only one customer (i.e., slicer: Customer XYZ). The horizontal table is composed of three horizontal stripes, one for the header, one in the body and one for the footer. The two first stripes are composed of four cells; the last stripe has only one. The footer shows the sum (e.g., aggregation) of visible values.

FIG. 11 shows a portion of an exemplary DataSource Query of a BlockQuery layer related to the report of FIG. 9. For each of the reporting objects 1102, there is attached the associated BlockQuery 1104. As described above, an exemplary BlockQuery is associated with a number of axes 1106 (i.e., zero or more), which describe a node that corresponds to the reporting object in the cube structure. BlockQuery 1104 also includes a DataSpace Expression 1108 that specifies the DataSpace attached to the node, as well as an optional DataSpace Expression.

Figure 12:
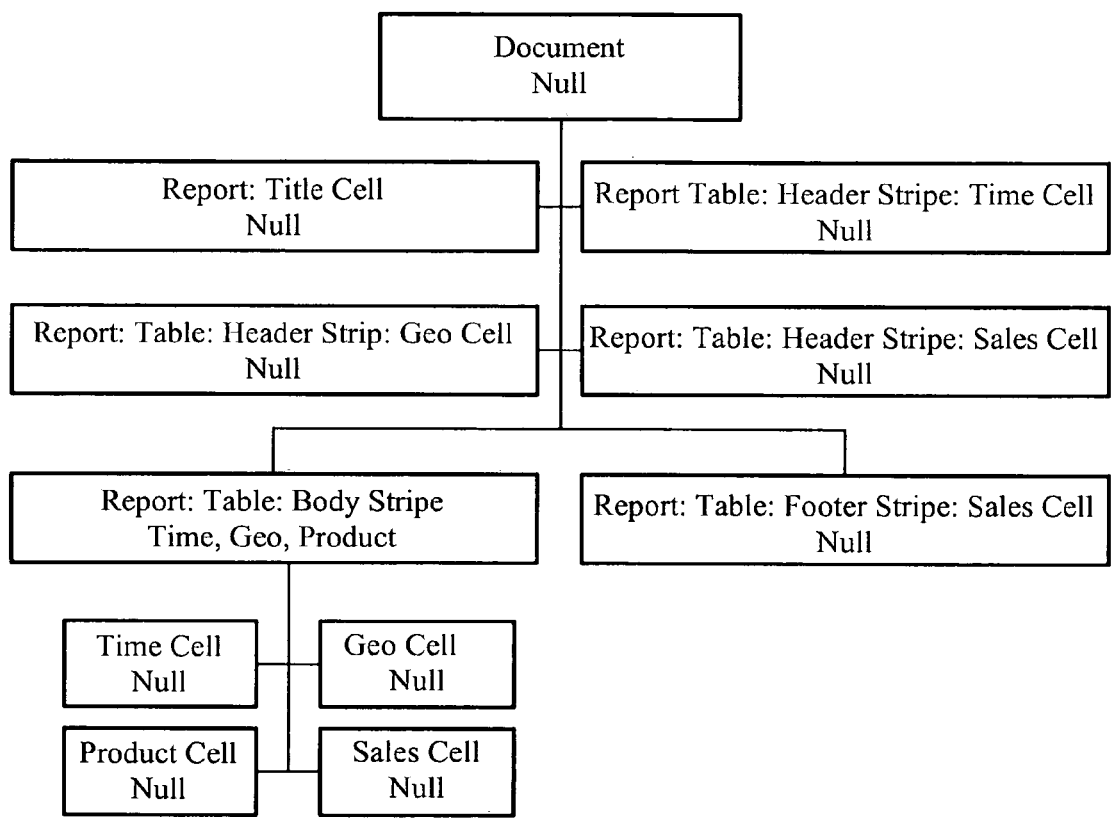
FIG. 12 is a simplified block diagram of an exemplary deduce cube structure for the tabular report of FIG. 9.

FIG. 12 illustrates how an exemplary Cadenza cube structure is deduced from the hierarchy of BlockQueries and their respective Axes. For example, the cube is deduced by removing all intermediate nodes with no axes, and by labeling each arrow by the path it represents in the hierarchy of reporting objects. It should be apparent that each of the cells can be accessed directly from the root by providing the corresponding arrow name, except for cells in the body for which on has to provide coordinates in the axis. Hence, structured coordinates for this cube may be:

| Report: | Title Cell | |
|---|---|---|
| Report: | Table: | Body Stripe: (95, US, SKU200) : Geo Cell |

FIG. 13 illustrates optimized DataSource Expressions as simplified, for example, in the Generic Data Source. In such a simplification, all empty DataSource Expressions are removed as well as most constant captions. The DataSource Expressions of FIG. 13 are data-source independent. Thereafter, such DataSource Expressions are transformed, for example, by a Specific Data Source into classical relational vocabulary, such as SQL, to build a query to retrieve the data from the physical data source. Hence, the query aspect of REPORT, THEN QUERY metaphor.

Although the present invention has been discussed with respect to specific embodiments, one of ordinary skill in the art will realize that these embodiments are merely illustrative, and not restrictive, of the invention. The scope of the invention is to be determined solely by the appended claims.

What is claimed is:

1. A computer implemented method for creating a report using a multidimensional data model and a database, wherein the multidimensional data model includes a plurality of dimensions organizing data as sets of values organized in a multidimensional cube structure, the method comprising:
   presenting to the user a plurality of reporting objects and metadata objects;
   accepting a user input to select at least one reporting object and one metadata object;
   parsing a selected reporting objects into layout information and a selected metadata object into data definition information;
   using the data definition information to form a deduced set of data;
   creating one or more queries based upon the deduced set of data; and
   querying a data source with the one or more queries to secure retrieved data associated with the deduced set of data; and
   presenting a report based upon the retrieved data and the layout information.

2. The method of claim 1,
   wherein each reporting object specifies at least one presentation object selected from a vertical table, a horizontal table, a cross table, a graph, a section, a page header, a page footer, and a cross-tab.

3. The method of claim 1, wherein accepting a user inputs includes dragging and dropping graphical representation of a reporting object in a position relative to one or more other graphically represented reporting objects, where the relative positions between graphically represented reporting objects determines layout information.

4. The method of claim 1, wherein accepting a user input includes entering instructions into a text editor.

5. The method of claim 1, wherein accepting a user inputs further comprises generating a report specification, wherein the report specification includes a set of computer program instructions.

6. The method of claim 5, wherein the set of computer program instructions include XML tags.

7. The method of claim 1, wherein using the data definition information to form a deduced data set further comprises deducing a physical cube structure.

8. The method of claim 7, further comprising creating a query based upon the physical cube structure using RDBMS query techniques.

9. The method of claim 7, further comprising creating a query based upon the physical cube structure using OLAP query techniques.

10. A computer readable storage medium including executable instructions to:
    present to a user a plurality of reporting objects and metadata objects;
    accept a user input to select at least one reporting object and one metadata object;
    parse a selected reporting object into layout information and a selected metadata object into data definition information;
    use the data definition information to form a deduced set of data;
    create one or more queries based upon the deduced set of data; and
    query a data source with the one or more queries to secure retrieved data associated with the deduced set of data; and
    present a report based upon the retrieved data and the layout information.

11. The computer readable medium of claim 10 wherein each reporting object specifies at least one presentation object selected from a vertical table, a horizontal table, a cross table, a graph, a section, a page header, a page footer, and a cross-tab.

12. The computer readable medium of claim 10 wherein the executable instructions to use the data definition information include executable instructions to deduce a physical cube structure.

13. The computer readable medium of claim 12 further comprising executable instructions to create a query based upon the physical cube structure.

* * * * *